United States Patent
Hong et al.

(10) Patent No.: US 11,411,686 B2
(45) Date of Patent: Aug. 9, 2022

(54) METHOD FOR PERFORMING HARQ PROCESS IN WIRELESS COMMUNICATION SYSTEM AND APPARATUS THEREFOR

(71) Applicant: LG Electronics Inc., Seoul (KR)

(72) Inventors: Uihyun Hong, Seoul (KR); Yunjung Yi, Seoul (KR); Hyunho Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 125 days.

(21) Appl. No.: 16/496,561

(22) PCT Filed: Mar. 26, 2018

(86) PCT No.: PCT/KR2018/003535
§ 371 (c)(1),
(2) Date: Sep. 23, 2019

(87) PCT Pub. No.: WO2018/174680
PCT Pub. Date: Sep. 27, 2018

(65) Prior Publication Data
US 2021/0105097 A1    Apr. 8, 2021

Related U.S. Application Data

(60) Provisional application No. 62/476,693, filed on Mar. 24, 2017.

(51) Int. Cl.
*H04L 1/18* (2006.01)
*H04L 5/00* (2006.01)
*H04W 72/04* (2009.01)

(52) U.S. Cl.
CPC .......... *H04L 1/1819* (2013.01); *H04L 5/0055* (2013.01); *H04W 72/042* (2013.01); *H04W 72/0446* (2013.01)

(58) Field of Classification Search
CPC .. H04L 1/1819; H04L 5/0055; H04W 72/042; H04W 72/0446
See application file for complete search history.

(56) References Cited

U.S. PATENT DOCUMENTS

| 2010/0074231 A1* | 3/2010 | Hsu | ................... H04W 72/1284 370/336 |
| 2010/0260130 A1 | 10/2010 | Earnshaw et al. | |

(Continued)

FOREIGN PATENT DOCUMENTS

| KR | 20110075445 A * | 7/2011 | ........... H04L 1/1812 |
| WO | 2016/175007 A1 | 11/2016 | |

OTHER PUBLICATIONS

Embuske et al., "Synchronous HARQ Timing Mode Change Control", Sep. 30, 2016, Telefonaktiebolaget LM Ericsson (PUBL, U.S. Appl. No. 62/402,295, Total pp. 27 (Year: 2016).*

(Continued)

*Primary Examiner* — Shah M Rahman
(74) *Attorney, Agent, or Firm* — Dentons US LLP

(57) ABSTRACT

A method for performing, by a terminal, an uplink HARQ process in a wireless communication system according to one embodiment of the present invention comprises the steps of: transmitting uplink data set to a first HARQ process ID; receiving an ACK/NACK response to the uplink data; and retransmitting the uplink data in response to the ACK/NACK response, wherein when the uplink data includes an SPS signal, the first HARQ process ID is set to one of values #0 to #n-1, and when the uplink data includes a non-SPS signal, the first HARQ process ID is set to one of values #n to #n+m-1, where n is the total number of HARQ processes that can be configured for the SPS signal, and m is the total number of HARQ processes that can be configured for the non-SPS signal.

6 Claims, 11 Drawing Sheets

(56) References Cited

U.S. PATENT DOCUMENTS

| | | | |
|---|---|---|---|
| 2012/0076078 A1* | 3/2012 | Han | H04L 1/1812 370/328 |
| 2013/0058291 A1* | 3/2013 | Ahn | H04L 5/0007 370/329 |
| 2013/0242824 A1* | 9/2013 | Lee | H04W 72/0446 370/281 |
| 2013/0250924 A1* | 9/2013 | Chen | H04L 1/1819 370/336 |
| 2014/0105191 A1* | 4/2014 | Yang | H04L 1/1867 370/336 |
| 2014/0362796 A1* | 12/2014 | Seo | H04W 72/0446 370/329 |
| 2016/0254901 A1* | 9/2016 | You | H04J 1/16 370/281 |
| 2017/0187494 A1* | 6/2017 | Tirronen | H04L 1/189 |
| 2018/0020335 A1* | 1/2018 | Yin | H04L 1/1854 |
| 2018/0048432 A1* | 2/2018 | Sun | H04L 1/1819 |
| 2018/0123744 A1* | 5/2018 | Nogami | H04L 5/0053 |
| 2018/0145798 A1* | 5/2018 | Suzuki | H04L 43/0864 |
| 2018/0343097 A1* | 11/2018 | Takeda | H04L 5/0055 |
| 2019/0191434 A1* | 6/2019 | Hugl | H04W 72/042 |
| 2020/0037280 A1* | 1/2020 | Enbuske | H04L 1/1812 |

OTHER PUBLICATIONS

Embuske et al., "Synchronous HARQ Timing Mode Change Control", Sep. 30, 2016, Telefonaktiebolaget LM Ericsson (PUBL), U.S. Appl. No. 62/402,295, Total pp. 27 (Year: 2016) (Year: 2016).*

Intel Corporation, "Asynchronous HARQ for PUSCH transmissions", 3GPP TSG-RAN WG1 #88 R1-1702161, Athens, Greece Feb. 13- 17, 2017, Total pp. 2 (Year: 2017).*

Ericsson, "Asynchronous HARQ for PUSCH", 3GPP TSG-RAN WG1 #88 R1-1703251, Athens, Greece Feb. 13-17, 2017, Total pp. 3 (Year: 2017).*

Nokia, et al.: "On asynchronous UL HARQ for 1ms TTI", R1-1702006, 3GPP TSG RAN WG1 Meeting #88, Athens, Greece, Feb. 13-17, 2017.

Huawei, et al.: "Asynchronous UL HARQ", R1-1701746, 3GPP TSG RAN WG1 Meeting #88, Athens, Greece, Feb. 13-17, 2017.

LG Electronics: "Discussion on dynamic switching between 1ms TTI and sTTI", R1-1702419, 3GPP TSG RAN WG1 Meeting #88, Athens, Greece, Feb. 13-17, 2017.

International Search Report from PCT/KR2018/003535, dated Jul. 16, 2018.

Written Opinion of the ISA from PCT/KR2018/003535, dated Jul. 16, 2018.

* cited by examiner

FIG. 2
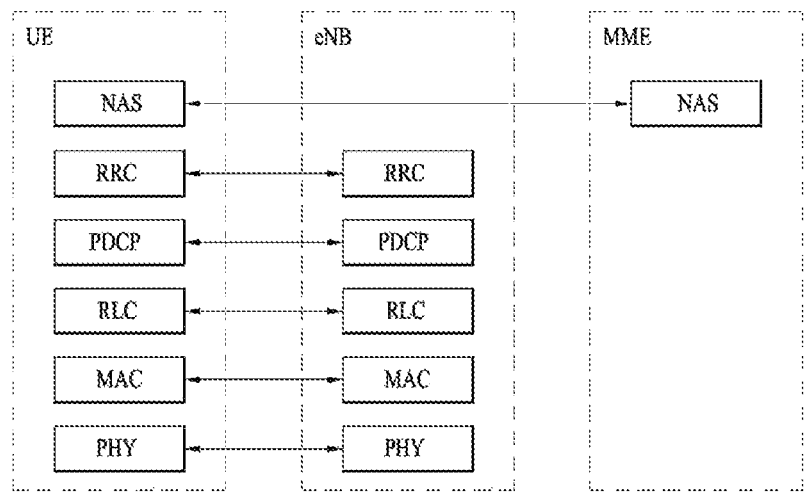
(a) Control-plane protocol stack
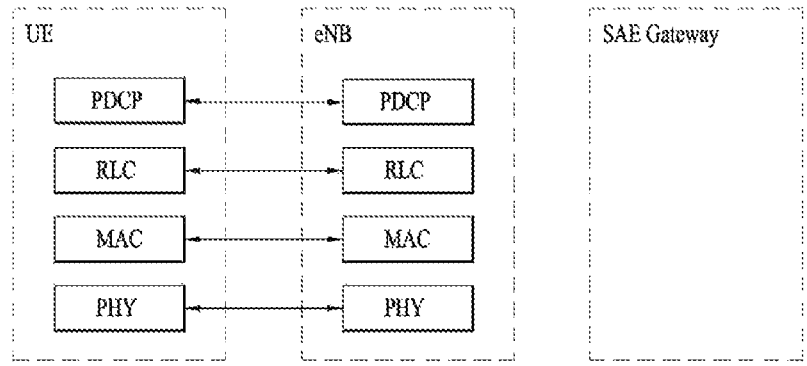
(b) User-plane protocol stack

METHOD FOR PERFORMING HARQ PROCESS IN WIRELESS COMMUNICATION SYSTEM AND APPARATUS THEREFOR

This application is a National Phase of PCT International Application No. PCT/KR2018/003535, filed on 26 Mar. 2018, which claims priority under 35 U.S.C. 119(e) to U.S. Provisional Application No. 62/476,693 filed on 24 Mar. 2017 which is hereby incorporated by reference herein in their entirety.

TECHNICAL FIELD

The present invention relates to a wireless communication system, and more particularly, to a method for performing HARQ process in a wireless communication system in which an SPS(Semi-Persistent Scheduling) signal and a normal uplink data signal (or non-SPS signal) are scheduled at the same time and an apparatus therefor.

BACKGROUND ART

As an example of a wireless communication system to which the present disclosure is applicable, a 3rd generation partnership project long term evolution (3GPP LTE) (hereinafter, referred to as 'LTE') communication system will be described in brief.

FIG. 1 is a diagram illustrating a network structure of an Evolved Universal Mobile Telecommunications System (E-UMTS) which is an example of a wireless communication system. The E-UMTS is an evolved version of the conventional UMTS, and its basic standardization is in progress under the 3rd Generation Partnership Project (3GPP). The E-UMTS may be referred to as a Long Term Evolution (LTE) system. Details of the technical specifications of the UMTS and E-UMTS may be understood with reference to Release 7 and Release 8 of "3rd Generation Partnership Project; Technical Specification Group Radio Access Network".

Referring to FIG. 1, the E-UMTS includes a User Equipment (UE), base stations (eNode B; eNB), and an Access Gateway (AG) which is located at an end of a network (E-UTRAN) and connected to an external network. The base stations may simultaneously transmit multiple data streams for a broadcast service, a multicast service and/or a unicast service.

One or more cells exist for one base station. One cell is set to one of bandwidths of 1.44, 3, 5, 10, 15 and 20 MHz to provide a downlink or uplink transport service to several UEs. Different cells may be set to provide different bandwidths. Also, one base station controls data transmission and reception for a plurality of UEs. The base station transmits downlink (DL) scheduling information of downlink data to the corresponding UE to notify the corresponding UE of time and frequency domains to which data will be transmitted and information related to encoding, data size, and hybrid automatic repeat and request (HARQ). Also, the base station transmits uplink (UL) scheduling information of uplink data to the corresponding UE to notify the corresponding UE of time and frequency domains that can be used by the corresponding UE, and information related to encoding, data size, and HARQ. An interface for transmitting user traffic or control traffic may be used between the base stations. A Core Network (CN) may include the AG and a network node or the like for user registration of the UE. The AG manages mobility of the UE on a Tracking Area (TA) basis, wherein one TA includes a plurality of cells.

In general, a wireless communication system is a multiple access system that supports communication with multiple users by sharing available radio resources (time, frequency, bandwidth, code, transmission power, etc.). For example, multiple access systems include a code division multiple access (CDMA) system, a frequency division multiple access (FDMA) system, a time division multiple access (TDMA) system, an orthogonal frequency division multiple access (OFDMA) system, and a single carrier frequency division multiple access (SC-FDMA) system.

In the 3GPP LTE system, the time taken for control information or user data to be transmitted on a single subframe is a transmission time interval (TTI). In general, the length of a single subframe is 1 ms. However, a next-generation wireless communication system for responding to a change of a higher data rate and a faster channel environment attempts to achieve latency of 1 ms on a user plane.

Latency is one of main factors for real-time user experience, and low latency is determined as a very important performance index even for a service that requires high reliability. Efforts to reduce HARQ process time required for the HARQ operation of the related art have been raised to satisfy such low latency request.

In response to reduction of the HARQ process time, a method for configuring HARQ process ID for determining a subframe for which data have been transmitted in response to HARQ ACK/NACK signal transmitted from a base station will be required.

DISCLOSURE

Technical Problem

An object of the present invention is to provide a method for performing HARQ process in a wireless communication system more efficiently and an apparatus therefor.

Another object of the present invention is to provide a method for transmitting or receiving HARQ ACK/NACK signal in a wireless communication system more efficiently and an apparatus therefor.

Still another object of the present invention is to provide a method for configuring HARQ process ID for each data in a wireless communication system status in which an SPS and a normal uplink data (non-SPS signal) are scheduled at the same time, and an apparatus therefor.

Further still another object of the present invention is to provide a method for configuring HARQ process ID for an SPS and HARQ process ID for normal uplink data when a wireless communication system, which performs a synchronous HARQ process, is switched to an asynchronous HARQ process to perform HARQ process, and an apparatus therefor.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

In accordance with one embodiment of the present specification, a method for performing, by a user equipment (UE), an uplink HARQ process in a wireless communication system comprises the steps of transmitting uplink data set to a first HARQ process ID; receiving an ACK/NACK response to the uplink data; and retransmitting the uplink data in response to the ACK/NACK response, wherein when the uplink data includes an SPS signal, the first HARQ process ID is set to one of values #0 to #n−1, and when the uplink data includes a non-SPS signal, the first HARQ process ID is set to one of values #n to #n+m−1, where n may be a total number of HARQ processes that can be configured for the SPS signal, and m may be a total number of HARQ processes that can be configured for the non-SPS signal.

In accordance with one embodiment of the present specification, a UE for performing an uplink HARQ process in a wireless communication system comprises a radio frequency (RF) unit; and a processor, wherein the processor is configured to transmit uplink data set to a first HARQ process ID, receive an ACK/NACK response to the uplink data, and retransmit the uplink data in response to the ACK/NACK response, and wherein when the uplink data includes an SPS signal, the first HARQ process ID is set to one of values #0 to #n−1, and when the uplink data includes a non-SPS signal, the first HARQ process ID is set to one of values #n to #n+m−1, where n may be a total number of HARQ processes that can be configured for the SPS signal, and m may be a total number of HARQ processes that can be configured for the non-SPS signal.

Also, the following may commonly be applied to the method for performing an uplink HARQ process in a wireless communication system and the apparatus therefor.

The UE may support switching from a synchronous HARQ process to an asynchronous HARQ process.

The method may further comprise the step of receiving information related to a switching timing from the synchronous HARQ process to the asynchronous HARQ process.

The method may further comprise the step of receiving DCI (downlink control information) through PDCCH (Physical Downlink Control information), wherein the UE is configured to perform the synchronous HARQ process if the DCI is received through a CSS (Common Search Space), and the UE is configured to perform the asynchronous HARQ process if the DCI is received through a USS (UE-specific/Dedicated Search Space).

When the UE performs the synchronous HARQ process, the ACK/NACK signal may be received at subframe #k, and the uplink data may be retransmitted at subframe #k+4, and when the UE performs the asynchronous HARQ process, the ACK/NACK signal may be received at subframe #k, and the uplink data are retransmitted at subframe #k+3.

When the uplink data include a non-SPS signal, the first HARQ process ID may be determined by the following Equation,

[(A*B+C)mod m]+n, where A may be a radio frame number at which the uplink data are transmitted, B may be the number of uplink subframes included in each radio frame, and C may be an index of a subframe at which the uplink data are transmitted.

Also, n may be 2, and m may be 8.

Advantageous Effects

According to one embodiment of the present invention, when a wireless communication system, which performs synchronous HARQ process, is switched to an asynchronous HARQ process to perform HARQ process, HARQ process for an SPS and HARQ process for normal uplink data (or non-SPS signal) may be identified from each other.

According to one embodiment of the present invention, latency in a wireless LAN system may be reduced through asynchronous HARQ process.

It will be appreciated by persons skilled in the art that that the effects that can be achieved through the present invention are not limited to what has been particularly described hereinabove and other advantages of the present invention will be more clearly understood from the following detailed description.

BRIEF DESCRIPTION OF THE DRAWINGS

The accompanying drawings, which are included to provide a further understanding of the disclosure and are incorporated in and constitute a part of this specification, illustrate embodiments of the disclosure and together with the description serve to explain the principles of the disclosure.

FIG. 2 illustrates control plane and user plane structures of a radio interface protocol between a UE and an E-UTRAN on the basis of the 3GPP wireless access network standard.

BEST MODE FOR CARRYING OUT THE INVENTION

Figure 1:
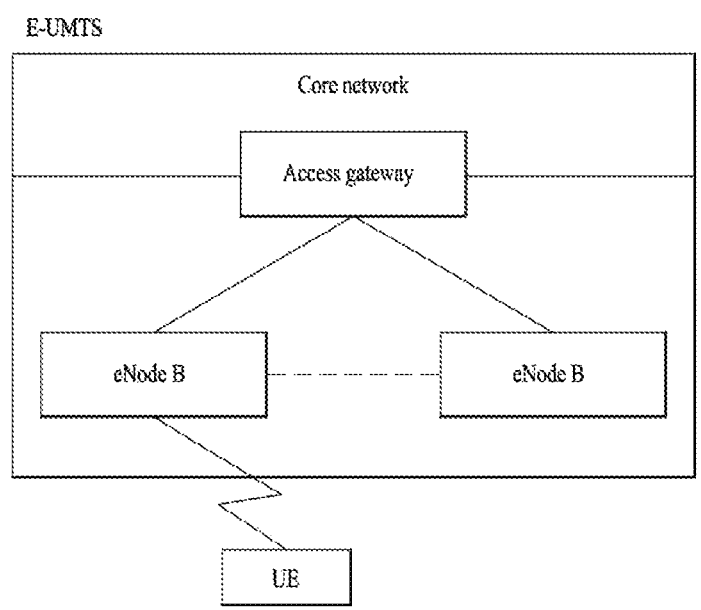
FIG. 1 schematically illustrates an E-UMTS network structure as an example of a wireless communication system.

Reference will now be made in detail to the exemplary embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details.

In some instances, known structures and devices are omitted or are shown in block diagram form, focusing on important features of the structures and devices, so as not to obscure the concept of the present invention. The same reference numbers will be used throughout this specification to refer to the same or like parts.

The following technology may be used for various wireless access technologies such as CDMA (code division multiple access), FDMA (frequency division multiple access), TDMA (time division multiple access), OFDMA (orthogonal frequency division multiple access), and SC-FDMA (single carrier frequency division multiple access). The CDMA may be implemented by the radio technology such as UTRA (universal terrestrial radio access) or CDMA2000. The TDMA may be implemented by the radio technology such as global system for mobile communications (GSM)/general packet radio service (GPRS)/enhanced data rates for GSM evolution (EDGE). The OFDMA may be implemented by the radio technology such as IEEE 802.11 (Wi-Fi), IEEE 802.16 (WiMAX), IEEE 802.20, and evolved UTRA (E-UTRA). The UTRA is a part of a universal mobile telecommunications system (UMTS). A 3rd generation partnership project long term evolution (3GPP LTE) is a part of an evolved UMTS (E-UMTS) that uses E-UTRA and adopts OFDMA in a downlink and SC-FDMA in an uplink. LTE-advanced (LTE-A) is an evolved version of the 3GPP LTE.

For clarification of the description, although the following embodiments will be described based on the 3GPP LTE/LTE-A, it is to be understood that the technical spirits of the present disclosure are not limited to the 3GPP LTE/LTE-A. Also, specific terminologies hereinafter used in the embodiments of the present disclosure are provided to assist understanding of the present disclosure, and various modifications may be made in the specific terminologies within the range that they do not depart from technical spirits of the present disclosure.

FIG. 2 is a diagram illustrating structures of a control plane and a user plane of a radio interface protocol between a UE and E-UTRAN based on the 3GPP radio access network standard. The control plane means a passageway where control messages are transmitted, wherein the control messages are used by the UE and the network to manage call. The user plane means a passageway where data generated in an application layer, for example, voice data or Internet packet data are transmitted.

A physical layer as the first layer provides an information transfer service to an upper layer using a physical channel. The physical layer is connected to a medium access control (MAC) layer via a transport channel, wherein the medium access control layer is located above the physical layer. Data are transferred between the medium access control layer and the physical layer via the transport channel. Data are transferred between one physical layer of a transmitting side and the other physical layer of a receiving side via the physical channel. The physical channel uses time and frequency as radio resources. In more detail, the physical channel is modulated in accordance with an orthogonal frequency division multiple access (OFDMA) scheme in downlink and is modulated in accordance with a single carrier frequency division multiple access (SC-FDMA) scheme in uplink.

A medium access control (MAC) layer of the second layer provides a service to a radio link control (RLC) layer above the MAC layer via a logical channel. The RLC layer of the second layer supports reliable data transmission. The RLC layer may be implemented as a functional block inside the MAC layer. In order to effectively transmit data using IP packets such as IPv4 or IPv6 within a radio interface having a narrow bandwidth, a packet data convergence protocol (PDCP) layer of the second layer performs header compression to reduce the size of unnecessary control information.

A radio resource control (RRC) layer located on the lowest part of the third layer is defined in the control plane only. The RRC layer is associated with configuration, re-configuration and release of radio bearers ('RBs') to be in charge of controlling the logical, transport and physical channels. In this case, the RB means a service provided by the second layer for the data transfer between the UE and the network. To this end, the RRC layers of the UE and the network exchange RRC message with each other. If the RRC layer of the UE is RRC connected with the RRC layer of the network, the UE is in an RRC connected mode. If not so, the UE is in an RRC idle mode. A non-access stratum (NAS) layer located above the RRC layer performs functions such as session management and mobility management.

One cell constituting a base station (eNB) is set to one of bandwidths of 1.4, 3.5, 5, 10, 15, and 20 MHz and provides a downlink or uplink transmission service to several UEs. At this time, different cells may be set to provide different bandwidths.

As downlink transport channels carrying data from the network to the UE, there are provided a broadcast channel (BCH) carrying system information, a paging channel (PCH) carrying paging message, and a downlink shared channel (SCH) carrying user traffic or control messages. Traffic or control messages of a downlink multicast or broadcast service may be transmitted via the downlink SCH or an additional downlink multicast channel (MCH). Meanwhile, as uplink transport channels carrying data from the UE to the network, there are provided a random access channel (RACH) carrying an initial control message and an uplink shared channel (UL-SCH) carrying user traffic or control message. As logical channels located above the transport channels and mapped with the transport channels, there are provided a broadcast control channel (BCCH), a paging control channel (PCCH), a common control channel (CCCH), a multicast control channel (MCCH), and a multicast traffic channel (MTCH).

Figure 3:
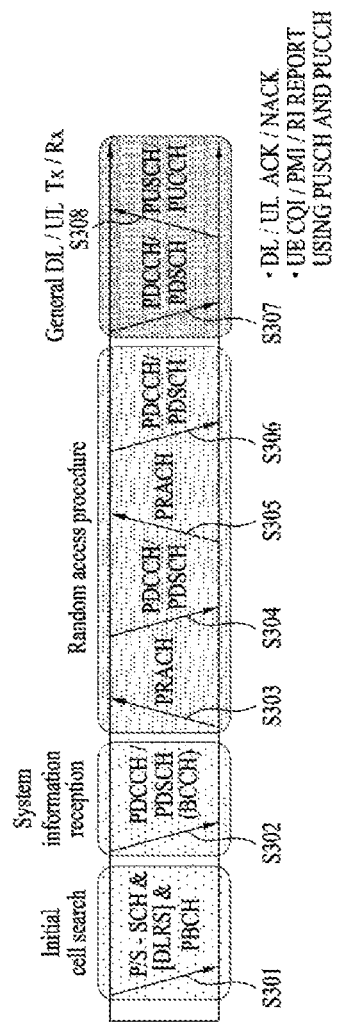
FIG. 3 illustrates physical channels used in a 3GPP system and a general signal transmission method using the same.

FIG. 3 is a diagram illustrating physical channels used in a 3GPP LTE system and a general method for transmitting a signal using the physical channels.

The UE performs initial cell search such as synchronizing with the base station when it newly enters a cell or the power is turned on at step S301. To this end, the UE synchronizes with the base station by receiving a primary synchronization channel (P-SCH) and a secondary synchronization channel (S-SCH) from the base station, and acquires information such as cell ID, etc. Afterwards, the UE may acquire broadcast information within the cell by receiving a physical broadcast channel (PBCH) from the base station. Meanwhile, the UE may identify a downlink channel status by receiving a downlink reference signal (DL RS) at the initial cell search step.

The UE which has finished the initial cell search may acquire more detailed system information by receiving a physical downlink shared channel (PDSCH) in accordance with a physical downlink control channel (PDCCH) and information carried in the PDCCH at step S302.

Afterwards, the UE may perform a random access procedure (RACH) such as steps S303 to S306 to complete access to the base station. To this end, the UE may transmit a preamble through a physical random access channel (PRACH) (S303) and receive a response message to the preamble through the PDCCH and the PDSCH corresponding to the PDCCH (S304). In case of a contention based RACH, the UE may perform a contention resolution procedure such as transmission (S305) of additional physical random access channel and reception (S306) of the physical downlink control channel and the physical downlink shared channel corresponding to the physical downlink control channel.

The UE which has performed the aforementioned steps may receive the physical downlink control channel (PDCCH)/physical downlink shared channel (PDSCH) (S307) and transmit a physical uplink shared channel (PUSCH) and a physical uplink control channel (PUCCH) (S308), as a general procedure of transmitting uplink/downlink signals. Control information transmitted from the UE to the base station will be referred to as uplink control information (UCI). The UCI includes HARQ ACK/NACK (Hybrid Automatic Repeat and reQuest Acknowledgement/Negative-ACK), SR (Scheduling Request), CSI (Channel State Information), etc. In this specification, the HARQ ACK/NACK will be referred to as HARQ-ACK or ACK/NACK (A/N). The HARQ-ACK includes at least one of positive ACK (simply, referred to as ACK), negative ACK (NACK), DTX and NACK/DTX. The CSI includes CQI (Channel Quality Indicator), PMI (Precoding Matrix Indicator), RI (Rank Indication), etc. Although the UCI is generally transmitted through the PUCCH, it may be transmitted through the PUSCH if control information and traffic data should be transmitted at the same time. Also, the UE may non-periodically transmit the UCI through the PUSCH in accordance with request/command of the network.

Figure 4:
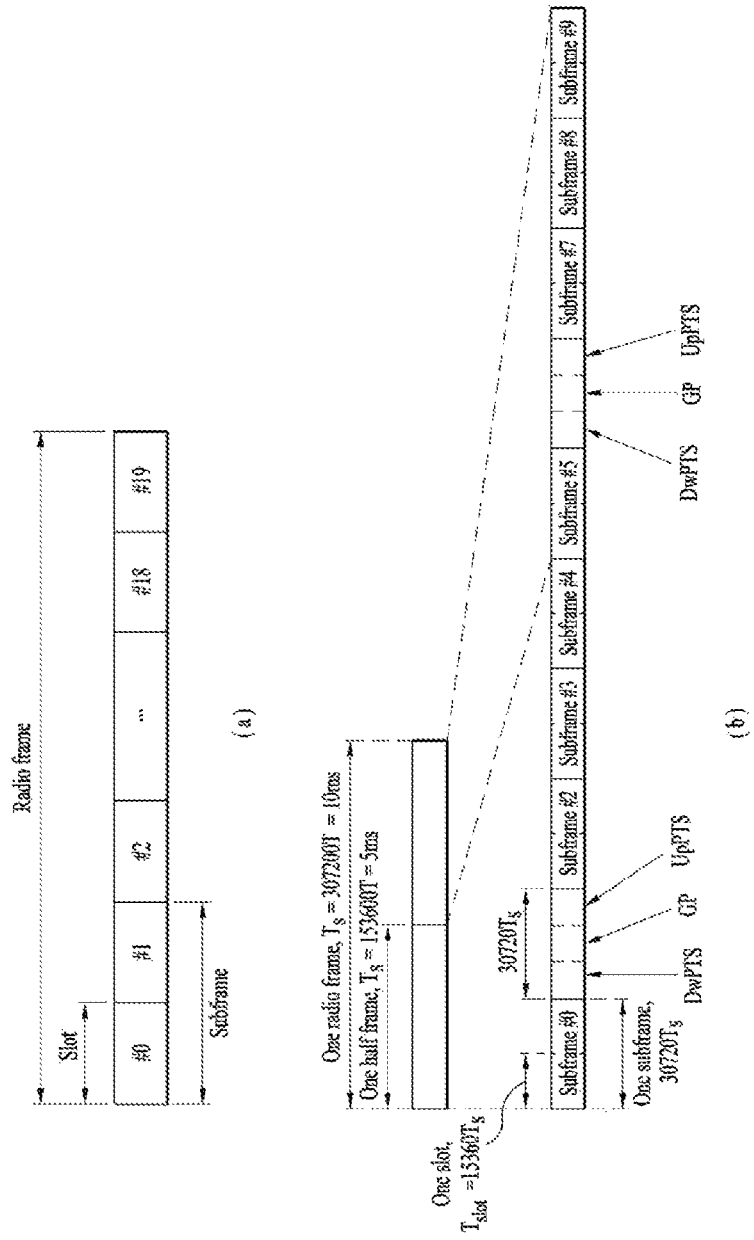
FIG. 4 illustrates a radio frame structure used in LTE.

FIG. 4 is a diagram illustrating a structure of a radio frame used in an LTE system.

Referring to FIG. 4, in a cellular OFDM radio packet communication system, uplink/downlink data packet transmission is performed in a unit of subframe, wherein one subframe is defined by a given time interval that includes a plurality of OFDM symbols. The 3GPP LTE standard supports a type 1 radio frame structure applicable to frequency division duplex (FDD) and a type 2 radio frame structure applicable to time division duplex (TDD).

FIG. 4(a) is a diagram illustrating a structure of a type 1 radio frame. The downlink radio frame includes 10 subframes, each of which includes two slots in a time domain. A time required to transmit one subframe will be referred to as a transmission time interval (TTI). For example, one subframe may have a length of 1 ms, and one slot may have a length of 0.5 ms. One slot includes a plurality of OFDM symbols in a time domain and a plurality of resource blocks (RB) in a frequency domain. Since the 3GPP LTE system uses OFDM in a downlink, OFDM symbols represent one symbol interval. The OFDM symbol may be referred to as SC-FDMA symbol or symbol interval. The resource block (RB) as a resource allocation unit may include a plurality of continuous subcarriers in one slot.

The number of OFDM symbols included in one slot may be varied depending on configuration of a cyclic prefix (CP). Examples of the CP include an extended CP and a normal CP. For example, if the OFDM symbols are configured by the normal CP, the number of OFDM symbols included in one slot may be 7. If the OFDM symbols are configured by the extended CP, since the length of one OFDM symbol is increased, the number of OFDM symbols included in one slot is smaller than that of OFDM symbols in case of the normal CP. For example, in case of the extended CP, the number of OFDM symbols included in one slot may be 6. If a channel state is unstable like the case where the UE moves at high speed, the extended CP may be used to reduce inter-symbol interference.

If the normal CP is used, since one slot includes seven OFDM symbols, one subframe includes 14 OFDM symbols. At this time, first maximum three OFDM symbols of each subframe may be allocated to a physical downlink control channel (PDCCH), and the other OFDM symbols may be allocated to a physical downlink shared channel (PDSCH).

FIG. 4(b) is a diagram illustrating a structure of a type 2 radio frame. The type 2 radio frame includes two half frames, each of which includes four general subframes, which include two slots, and a special subframe which includes a downlink pilot time slot (DwPTS), a guard period (GP), and an uplink pilot time slot (UpPTS).

In the special subframe, the DwPTS is used for initial cell search, synchronization or channel estimation at the UE. The UpPTS is used for channel estimation at the base station and uplink transmission synchronization of the UE. In other words, the DwPTS is used for downlink transmission, whereas the UpPTS is used for uplink transmission. Especially, the UpPTS is used for PRACH preamble or SRS transmission. Also, the guard period is to remove interference occurring in the uplink due to multipath delay of downlink signals between the uplink and the downlink.

Configuration of the special subframe is defined in the current 3GPP standard document as illustrated in Table 1 below. Table 1 illustrates the DwPTS and the UpPTS in case of $T_s=1/(15000 \times 2048)$, and the other region is configured for the guard period.

TABLE 1

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $(1+X) \cdot 2192 \cdot T_s$ | $(1+X) \cdot 2560 \cdot T_s$ | $7680 \cdot T_s$ | $(1+X) \cdot 2192 \cdot T_s$ | $(1+X) \cdot 2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $(2+X) \cdot 2192 \cdot T_s$ | $(2+X) \cdot 2560 \cdot T_s$ |
| 5 | $6592 \cdot T_s$ | $(2+X) \cdot 2192 \cdot T_s$ | $(2+X) \cdot 2560 \cdot T_s$ | $20480 \cdot T_s$ | | |
| 6 | $19760 \cdot T_s$ | | | $23040 \cdot T_s$ | | |
| 7 | $21952 \cdot T_s$ | | | $12800 \cdot T_s$ | | |
| 8 | $24144 \cdot T_s$ | | | — | — | — |
| 9 | $13168 \cdot T_s$ | | | — | — | — |

In the meantime, the structure of the type 2 radio frame, that is, uplink/downlink configuration (UL/DL configuration) in the TDD system is as illustrated in Table 2 below.

TABLE 2

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In the above Table 2, D means the downlink subframe, U means the uplink subframe, and S means the special subframe. Also, Table 2 also illustrates a downlink-uplink switching period in the uplink/downlink subframe configuration of each system.

The aforementioned structure of the radio frame is only exemplary, and the number of subframes included in the radio frame, the number of slots included in the subframe, or the number of symbols included in the slot may be changed in various ways.

Figure 5:
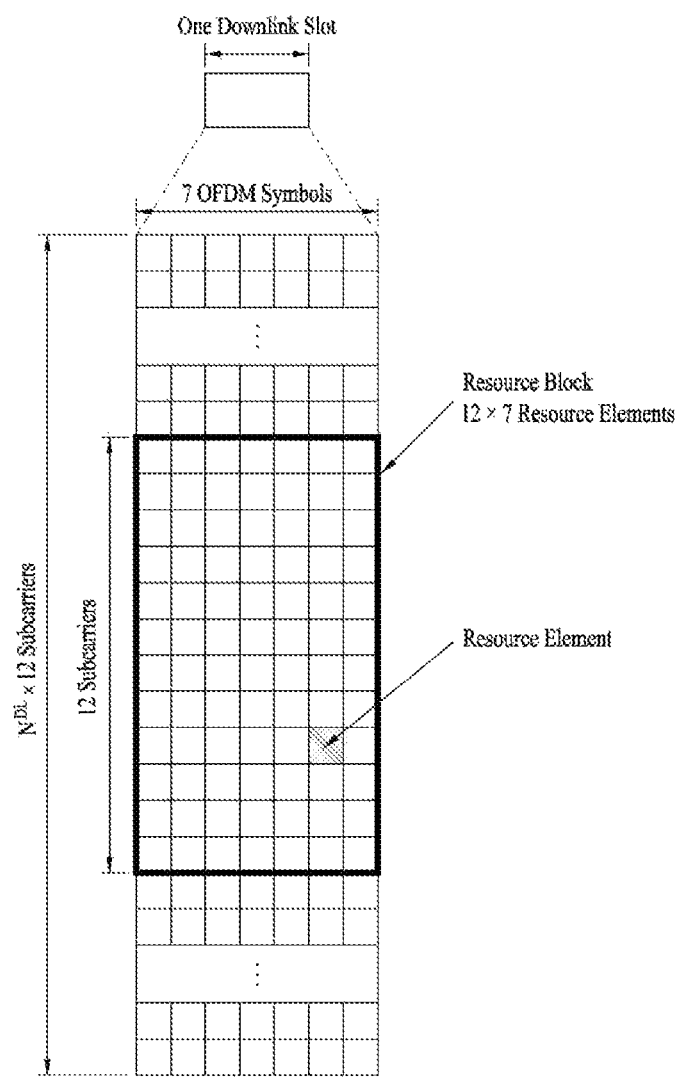
FIG. 5 illustrates a resource grid for a downlink slot.

FIG. 5 illustrates a resource grid for a downlink slot.

Referring to FIG. 5, a DL slot includes $N_{symb}^{DL}$ OFDM symbols in a time domain and $N_{RB}^{DL}$ resource blocks in a frequency domain. Since each of the resource blocks includes $N_{sc}^{RB}$ subcarriers, the DL slot includes $N_{RB}^{DL} \times N_{sc}^{RB}$ subcarriers in the frequency domain. Although FIG. 5 shows an example in which the DL slot includes 7 OFDM symbols and the resource block includes 12 subcarriers, the present disclosure is not limited thereto. For instance, the number of OFDM symbols included in the DL slot can vary depending to a length of a cyclic prefix (CP).

Each element on a resource grid is referred to as a resource element (RE) and a single resource element is indicated by one OFDM symbol index and one subcarrier index. A single RB is configured with $N_{symb}^{DL} \times N_{sc}^{RB}$ resource elements. The number ($N_{RB}^{DL}$) of resource blocks included in the DL slot depends on a DL transmission bandwidth configured in a cell.

Figure 6:
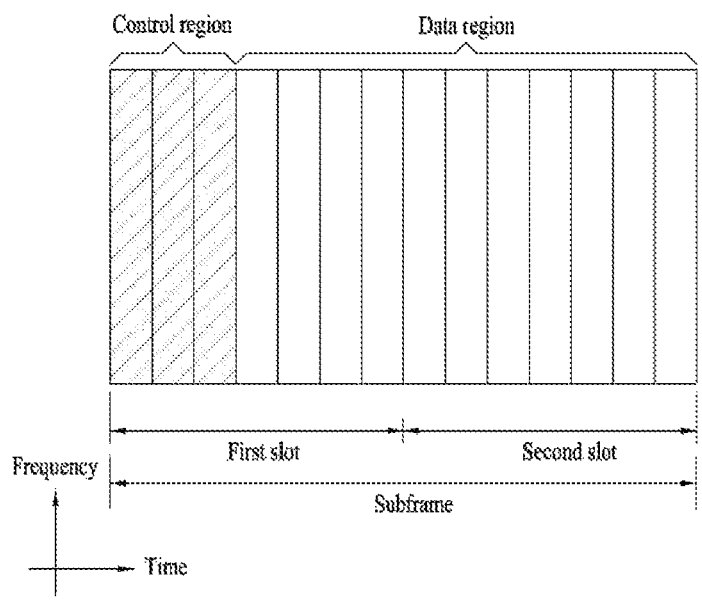
FIG. 6 illustrates a structure of a downlink radio frame used in an LTE system.

FIG. 6 illustrates a structure of a downlink radio frame.

Referring to FIG. 6, up to 3 (or 4) OFDM symbols located at a head part of a first slot of a subframe correspond to a control region to which a control channel is assigned. And, the rest of OFDM symbols correspond to a data region to which PDSCH (physical downlink shared channel) is assigned. For example, DL control channels used in the LTE system may include a PCFICH (physical control format indicator channel), a PDCCH (physical downlink control channel), a PHICH (physical hybrid ARQ indicator channel) and the like. The PCFICH is transmitted on a first OFDM symbol of a subframe and carries information on the number of OFDM symbols in the subframe used for control channel transmission. The PHICH carries an HARQ ACK/NACK (hybrid automatic repeat request acknowledgment/negative-acknowledgment) signal in response to UL transmission.

Control information transmitted on the PDCCH is called DCI (downlink control information). The DCI includes resource allocation information and other control information for a UE or a UE group. For instance, the DCI may include UL/DL scheduling information, UL transmission (Tx) power control command and the like.

The PDCCH carries transmission format and resource allocation information of a DL-SCH (downlink shared channel), transmission format and resource allocation information of a UL-SCH (uplink shared channel), paging information on a PCH (paging channel), system information on a DL-SCH, resource allocation information of a higher-layer control message such as a random access response transmitted on a PDSCH, a Tx power control command set for individual UEs in a UE group, a Tx power control command, activation indication information of a VoIP (voice over IP) and the like. A plurality of PDCCHs may be transmitted in a control region. A UE can monitor a plurality of PDCCHs. The PDCCH is transmitted on aggregation of one or more consecutive CCEs (control channel elements). In this case, the CCE is a logical assignment unit used in providing the PDCCH with a coding rate based on a radio channel state. The CCE corresponds to a plurality of REGs (resource element groups). The PDCCH format and the number of PDCCH bits are determined depending on the number of CCEs. A base station determines the PDCCH format in accordance with DCI to be transmitted to a UE and attaches CRC (cyclic redundancy check) to control information. The CRC is masked with an identifier (e.g., RNTI (radio network temporary identifier)) in accordance with an owner or a purpose of use. For instance, if a PDCCH is provided for a specific UE, CRC may be masked with an identifier (e.g., C-RNTI (cell-RNTI)) of the corresponding UE. If a PDCCH is provided for a paging message, CRC may be masked with a paging identifier (e.g., P-RNTI (paging-RNTI)). If a PDCCH is provided for system information (particularly, SIC (system information block)), CRC may be masked with an SI-RNTI (system information-RNTI). In addition, if a PDCCH is provided for a random access response, CRC may be masked with an RA-RNTI (random access-RNTI).

Figure 7:
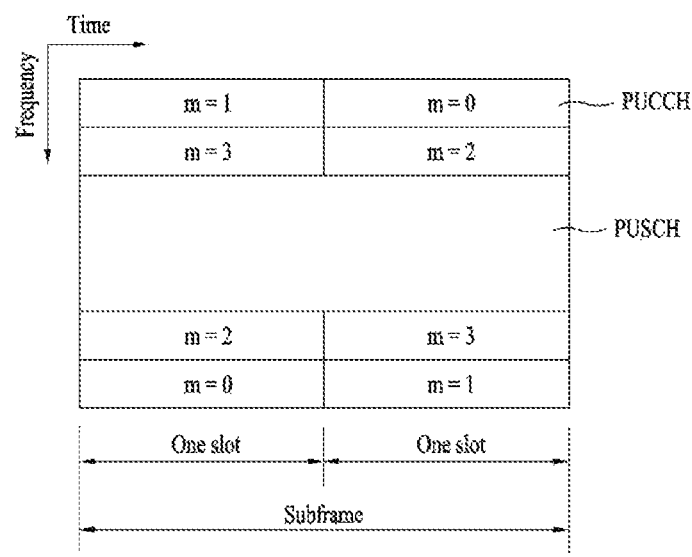
FIG. 7 illustrates a structure of an uplink radio frame used in an LTE system.

FIG. 7 illustrates a structure of an uplink subframe used in an LTE system.

Referring to FIG. 7, an uplink subframe includes a plurality (e.g., 2 slots) of slots. Each of the slots may include a different number of SC-FDMA symbols depending on a length of CP. The UL subframe may be divided into a data region and a control region in the frequency domain. The data region includes a PUSCH and is used to transmit such a data signal as audio and the like. The control region includes a PUCCH and is used to transmit UCI (uplink control information). The PUCCH includes an RB pair located at both ends of the data region on a frequency axis and is hopped on a slot boundary.

The PUCCH can be used to transmit the following control information.

SR (scheduling request): This is information used to request a UL-SCH resource and is transmitted using an OOK (on-off keying) scheme.

HARQ ACK/NACK: This is a response signal in response to a DL data packet on a PDSCH and indicates whether the DL data packet has been successfully received. 1-bit ACK/NACK is transmitted as a response to a single downlink codeword and 2-bit ACK/NACK is transmitted as a response to two downlink codewords.

CSI (channel state information): This is feedback information on a downlink channel. The CSI includes a channel quality indicator (CQI). MIMO (multiple input multiple output) related feedback information includes a rank indicator (RI), a precoding matrix indicator (PMI), a precoding type indicator (PTI) and the like. 20-bit is used in each subframe.

The amount of control information (UCI) that a UE can transmit in a subframe depends on the number of SC-FDMA symbols available for transmission of the control information. The SC-FDMA symbols available for the transmission of the control information correspond to the rest of SC-FDMA symbols except SC-FDMA symbols used for transmitting a reference signal in the subframe. In case of a subframe in which a sounding reference signal (SRS) is configured, the last SC-FDMA symbol of the subframe is excluded from the SC-FDMA symbols available for the transmission of the control information. The reference signal is used for coherent detection of a PUCCH.

Hereinafter, an HARQ process will be described. A plurality of parallel HARQ processes for UL transmission exist in the UE. The plurality of parallel HARQ processes are used to continuously perform UL transmission while the UE waits for HARQ feedback indicating whether previous UL transmission has been successful or not. Each HARQ process relates to an HARQ buffer of a MAC (Medium Access Control) layer. Each HARQ process manages the number of transmissions of a MAC PDU (Physical Data Unit) in the buffer, HARQ feedback for the MAC PDU in the buffer, and a state parameter regarding a redundancy version (RV).

In case of LTE(-A) FDD, the number of UL HARQ processes for non-subframe bundling operation (i.e., normal HARQ operation) is 8. In case of LTE(-A) TDD, the number of UL HARQ processes and HARQ RTT (Round Trip Time) are set differently per DL-UL configuration because the number of UL subframes depends on UL-DL configuration. In this case, the HARQ RTT may mean a time interval (in the unit of SF or ms, for example) between a time when a UL grant is received and a time when a PHICH (corresponding to the UL grant) is received through transmission of a PUSCH (corresponding the UL grant) or a time interval between a PUSCH transmission time and a PUSCH retransmission time. When subframe bundling is applied, a bundle of PUSCHs configured of 4 contiguous UL subframes is transmitted in FDD and TDD. Therefore, HARQ operation/process when subframe bundling is applied is different from the aforementioned normal HARQ operation/process.

Hereinafter, SPS(Semi-Persistent Scheduling) signal will be described. The SPS may be allocated in a wireless communication system that requires periodic communication. Generally, the SPS may be allocated for VoIP communication. Configuration related to the SPS signal may be configured through an upper layer. The SPS signal may be configured through SPS configuration IE (information element) transmitted through the upper layer. For example, the SPS configuration IE shown in Table 3 below may be transmitted from the upper layer.

TABLE 3

SPS-Config ::=SEQUENCE {
semiPersistSchedC-RNTI C-RNTI OPTIONAL, -- Need OR
sps-ConfigDL SPS-ConfigDL OPTIONAL, -- Need ON
sps-ConfigUL SPS-ConfigUL OPTIONAL -- Meed ON
}
SPS-ConfigDL ::= CHOICE{
release ULL,
setup SEQUENCE {
semiPersistSchedIntervalDL ENUMERATED {
sf10, sf20, sf32, sf40, sf64, sf80,
sf128, sf160, sf320, sf640, spare6,
spare5, spare4, spare3, spare2,
spare1},
numberOfConfSPS-Processes INTEGER (1..8),
n1-PUCCH-AN-PersistentList N1-PUCCH-AN-PersistentList,
..., TABLE 3-continued

[[twoAntennaPortActivated-r10 CHOICE {
release NULL,
setup SEQUENCE {
n1-PUCCH-AN-PersistentListP1-r10 N1-PUCCH-AN-PersistentList
}
OPTIONAL -- Need ON
]]
}
}
SPS-ConfigUL ::= CHOICE {
release NULL,
setup SEQUENCE {
semiPersistSchedIntervalUL ENUMERATED {
sf10, sf20, sf32, sf40, sf64, sf80,
sf128, sf160, sf320, sf640, spare6,
spare5, spare4, spare3, spare2,
spare1},
implicitReleaseAfter ENUMERATED {e2, e3, e4, e8},
p0-Persistent SEQUENCE {
p0-NominalPUSCH-Persistent INTEGER (-126..24),
p0-UE-PUSCH-Persistent INTEGER (-8..7),
} OPTIONAL, -- Need OP
twoIntervalsConfig ENUMERATED {true} OPTIONAL, -- Cond TDD
...
}
}
N1PUCCH-AN-PersistentList ::= SEQUENCE SIZE (1...4) OF
INTEGER (0..2047)

The SPS configuration IE may include an SPS C-RNTI parameter, an SPS downlink configuration IE(SPS-ConfigDL IE) and an SPS uplink configuration IE(SPS-ConfigUL IE). The SPS-ConfigDL IE indicates SPS configuration in the downlink, and the SPS-ConfigUL IE indicates SPS configuration in the uplink.

A period of the downlink SPS signal may be indicated in a unit of subframe. In the TDD system, the period of the downlink SPS signal may be indicated in a unit of subframe. Also, in the TDD system, the period of the downlink SPS signal may be a value obtained by rounding off a value of semiPersistSchedIntervalDL parameter in Table 3 to a value close to a multiple of 10 subframe. For example, in the TDD system, if a value of the semiPersistSchedIntervalDL parameter is set to 32 subframe, the period of the downlink SPS signal may be set to 30 subframe not 32 subframe.

In the above Table 3, numberOfConfSPS-Processes parameter may indicate the number of HARQ processes configured in the SPS signal. Also, in the above Table 3, n1-PUCCH-AN-PersistentList parameter and n1-PUCCH-AN-PersistentListP1 parameter may indicate nPUCCH (1,p) values for antenna ports P0 and P1, respectively.

In the above Table 3, semiPersistSchedIntervalUL parameter may indicate a period of an uplink SPS signal. In the same manner as the semiPersistSchedIntervalDL parameter, the period of the uplink SPS signal in the TDD system may be a value obtained by rounding off the value of the semiPersistSchedIntervalUL parameter to a value close to a multiple of 10 subframe. For example, in the TDD system, if a value of the semiPersistSchedIntervalUL parameter is set to 32 subframe, the period of the uplink SPS signal may be set to 30 subframe not 32 subframe.

In the above Table 3, implicitReleaseAfter parameter may indicate the number of empty transmissions prior to implicit release of SPS signal transmission.

Activation and release of SPS signal allocation may be performed through PDCCH. The UE may validate PDCCH for SPS signal allocation if CRC (cyclic redundancy check) parity bits obtained from PDCCH payload are scrambled with SPS C-RNTI or a new data indicator field is set to 0. The UE may perform blind decoding for PDCCH CRC-scrambled with SPS C-RNTI to detect allocation of an uplink SPS session, and this blind decoding may be performed in a CSS (Common search space) or USS (UE-specific/Dedicated Search Space).

Hereinafter, based on the aforementioned description, a method for configuring HARQ process ID and transmitting and receiving HARQ ACK/NACK signal according to some embodiments of the present invention will be described.

In an advanced wireless communication system, in accordance with a user service or user request, a status that a variety of HARQ process times are set to a specific channel of various application fields may be considered. Particularly, in case of a service that requires reliability, a status that HARQ process time used for transmission of a channel such as PDSCH and PUSCH is set to be shorter than n+4 in the legacy LTE operation may be considered for the purpose of reducing latency. As an example of this status, it may be considered that HARQ process is performed through HARQ process time of n+3.

At this time, an asynchronous HARQ process having HARQ process time of n+3 may be considered for the purpose of reducing the HARQ process time. If the synchronous HARQ process having the legacy HARQ process time of n+4 is switched to the asynchronous HARQ process having HARQ process time of n+3, HARQ process based on HARQ process ID may be performed to avoid subframe mismatching according to the changed HARQ process.

However, if transmission of the SPS signal is scheduled in the UE together with transmission of normal uplink data, a problem may occur in that HARQ process ID of the SPS signal and HARQ process ID of the legacy uplink data signal collide with each other.

Also, if the synchronous HARQ process for normal uplink data is switched to the asynchronous HARQ process, PHICH signal used for n+4 ACK/NACK signal transmission which is a response to normal uplink data is not required for the synchronous HARQ process any more. At this time, a problem may occur in processing the PHICH signal.

Hereinafter, in a wireless communication system in which the HARQ process may be switched from the synchronous HARQ process to the asynchronous HARQ process, if the HARQ process ID of the SPS signal collides with the HARQ process ID of the normal uplink data, a method for configuring HARQ process ID for each signal and processing the PHICH signal will be suggested.

Hereinafter, normal uplink data signal or normal uplink data may be referred to as a non-SPS signal. In this case, the non-SPS signal may be defined as every uplink data signal except the SPS signal that may be transmitted to the base station by the UE. Also, the uplink data may be used to refer to both the SPS signal and the non-SPS signal.

Embodiment 1: HARQ Process ID Allocation

If the synchronous HARQ process and the asynchronous HARQ process are selectively operated in the wireless communication system, the UE should determine corresponding subframe retransmission indicated by HARQ ACK/NACK signal which is received.

To solve this problem, HARQ process ID may be suggested. The HARQ process ID may be used for both the synchronous HARQ process and the asynchronous HARQ process. However, if scheduling of the SPS signal and scheduling of the non-SPS signal are performed at the same time, since additional allocation of the HARQ process ID for the SPS signal should be performed, a problem occurs in that the HARQ process ID for the SPS signal and the HARQ process ID for the non-SPS signal may be overlapped with each other.

Figure 8:
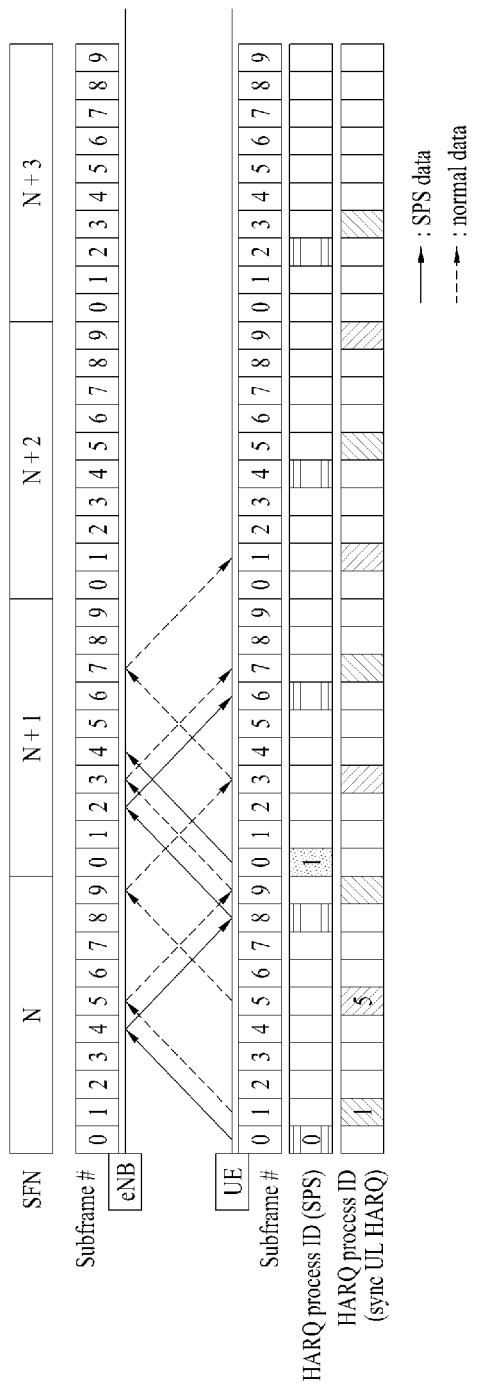
FIG. 8 is a diagram illustrating HARQ process of the related art.

FIG. 8 is a diagram illustrating HARQ process of the related art.

FIG. 8 illustrates a problem that may occur when the SPS signal and the non-SPS signal are scheduled at the same time. FIG. 8 illustrates the status that different non-SPS signals are transmitted through subframe #1 and subframe #5 of a radio frame N. In this case, retransmission of HARQ process for the subframe #1 may be performed at subframe #9 of the radio frame N, and retransmission of HARQ process for the subframe #5 may be performed at subframe #3 of a radio frame N+1. In the related art, HARQ process ID for each non-SPS signal transmission may be determined in accordance with the following Equation 1.

[Radio frame number×the number of uplink subframes existing per radio frame+subframe index at which non-SPS signal is transmitted]mod[a total number of HARQ processes that may be configured for the non-SPS signal]    [Equation 1]

As illustrated in FIG. 8, if the SPS signal is scheduled at subframe #0 of the radio frame N, retransmission for the SPS signal is performed at #8 of the radio frame N. At this time, HARQ process ID for SPS transmission may be allocated as 0.

FIG. 8 illustrates that SPS signal scheduling is available. That is, FIG. 8 illustrates the status of numberOfConfUl-SPS-Processes=2, semiPersistSchedIntervalUL=10sf in the above Table 3. At this time, since the period of the SPS signal is 10 subframe, the SPS signal may be scheduled even at subframe 0 of the radio frame of N+1. In this case, HARQ process ID should be allocated to 1 as illustrated in FIG. 8, but HARQ process ID 1 is already allocated to the non-SPS signal transmitted at subframe #1 of the radio frame N, whereby a problem occurs in that HARQ process ID to be allocated to the second SPS signal collides with HARQ process ID of the non-SPS signal.

Hereinafter, it is assumed that the number of SPS signals which are contiguously scheduled is 2 and the period of the SPS signal is 10sf. This is only exemplary, and the present invention is not limited to this assumption. Parameters of the SPS signal may have various values, and are not limited to a specific value. For example, the parameters of the SPS signal may be suggested as values suggested in the above Table 3.

Figure 9:
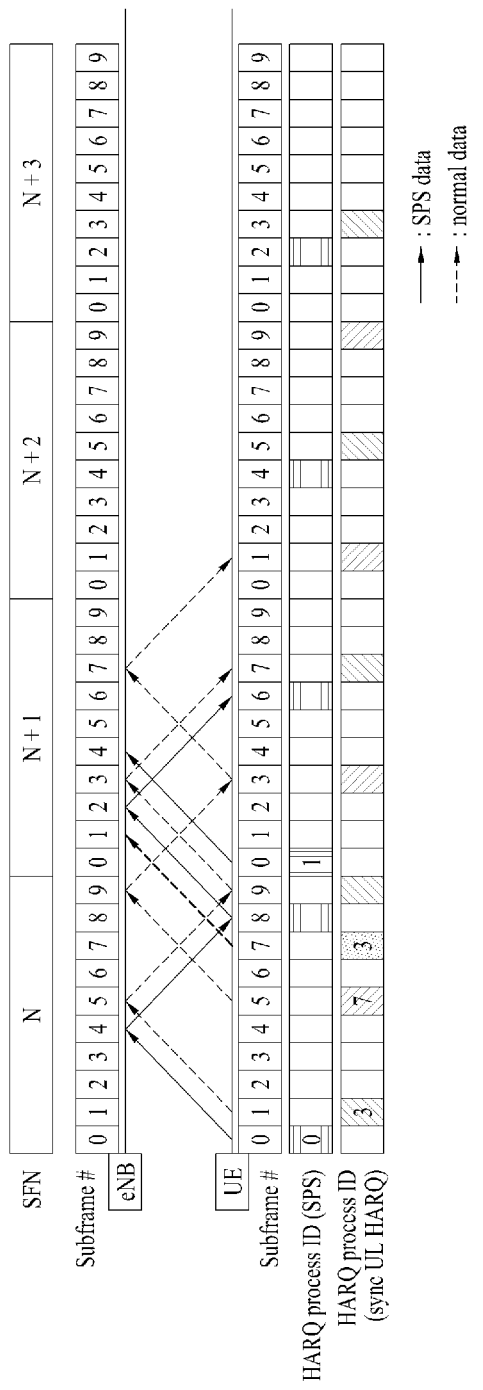
FIG. 9 is a diagram illustrating HARQ process according to one embodiment of the present invention.

FIG. 9 is a diagram illustrating HARQ process according to one embodiment of the present invention.

To solve the problem occurring in FIG. 8, HARQ process ID which satisfies the following Equation 2 may be allocated to HARQ process ID of the non-SPS signal.

[Radio frame number×the number of uplink subframes existing per radio frame+subframe index at which non-SPS signal is transmitted]mod[a total number of HARQ processes that may be configured for the non-SPS signal−a total number of HARQ processes configured for the SPS signal]+[a total number of HARQ processes configured for the SPS signal]    [Equation 2]

FIG. 9 illustrates the result of allocation of the HARQ process ID according to the Equation 2. FIG. 9 illustrates that HARQ process IDs 0 and 1 are allocated for two SPS signals and HARQ process ID 2 or 7 is allocated for the non-SPS signal.

If the HARQ process ID is used as above, the HARQ process ID of the SPS signal is not overlapped with the HARQ process ID of the non-SPS signal. However, a problem occurs in that the number of HARQ processes of the non-SPS signal is reduced from 8 to the number of HARQ processes of the SPS signal.

That is, in FIG. 9, if a new non-SPS signal is transmitted at subframe #7 of the radio frame N, according to the related art, HARQ process should be given to 3. However, since HARQ process ID 3 is already allocated to the non-SPS signal transmitted at subframe #1 of the radio frame N, a problem occurs in that HARQ process IDs between different non-SPS signals collide with each other.

Figure 10:
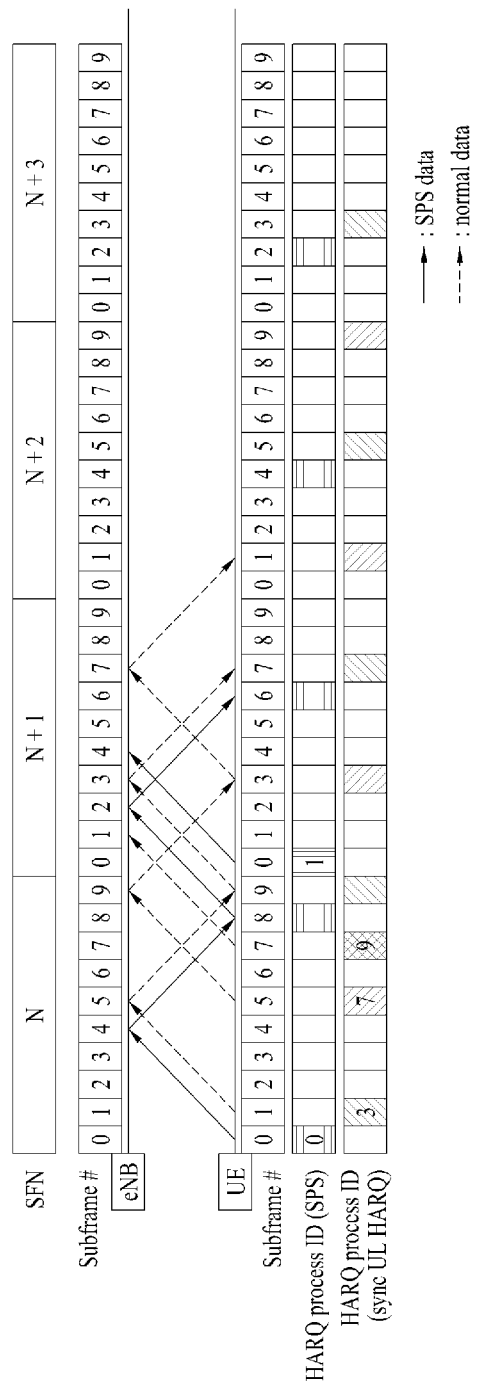
FIG. 10 is a diagram illustrating HARQ process according to one embodiment of the present invention.

FIG. 10 is another diagram illustrating HARQ process according to one embodiment of the present invention.

To solve the problem occurring in FIG. 9, HARQ process ID which satisfies the following Equation 3 may be allocated to HARQ process ID of the non-SPS signal.

[Radio frame number×the number of uplink subframes existing per radio frame+subframe index at which non-SPS signal is transmitted]mod[a total number of HARQ processes that may be configured for the non-SPS signal]+[a total number of HARQ processes configured for the SPS signal]  [Equation 3]

FIG. 10 illustrates that the non-SPS signal is transmitted using the HARQ process ID allocated in accordance with the Equation 3. That is, FIG. 10 illustrates that HARQ process IDs 0 and 1 are allocated for two SPS signals and HARQ process ID 2 or 9 is allocated for the non-SPS signal. That is, FIG. 10 illustrates the legacy UE allocates HARQ process IDs 0 to 9 instead of HARQ process IDs 0 to 7.

However, in this case, since the number of HARQ process IDs is increased from 8 to 10, the number of bits used for signaling for indicating HARQP process ID should be increased from 3 bits to 4 bits.

In this way, if the HARQ process ID of the SPS signal and the HARQ process ID of the non-SPS signal are allocated using HARQ process IDs 0 to 9, the HARQ process IDs of the SPS signal and the non-SPS signal may not be overlapped with each other.

In another way, the HARQ process ID of the SPS signal may be allocated to be varied depending on subframe index to which a signal is transmitted, in the same manner as the legacy HARQ process ID allocation. That is, the HARQ process IDs allocated to both the SPS signal and the non-SPS signal may be set to be determined by the following Equation 4.

[Radio frame number×the number of uplink subframes existing per radio frame+subframe index at which uplink data are transmitted]mod[a total number of HARQ processes that may be configured for the uplink data]  [Equation 4]

If the HARQ process ID of the SPS signal is allocated through the Equation 4, since the HARQ process ID according to the same reference is allocated to the SPS signal and the non-SPS signal, a restriction in HARQ process ID allocation of the SPS signal occurs. According to the Equation 4, the SPS signal may have all of the values 0 to 7 as HARQ process IDs, and signal retransmission for each of the values may be scheduled.

For example, if the HARQ process ID is allocated to two SPS signals in the same manner as the above example, according to the Equation 4, combination of the HARQ process ID for the SPS signal may be performed as [0,1], [2,3], [4,5], [6,7]. In this case, the UE may allow the number of HARQ process IDs allocated to the SPS not to exceed 2 by using information indicating that the number of HARQ process IDs of the SPS signal is changed depending on a corresponding rule.

For example, if the UE transmits a new SPS signal through HARQ process IDs 0 and 1, the number of HARQ processes triggered by the corresponding SPS signal may be stored separately, whereby the new SPS signal may not be triggered until ACK/NACK transmission of the corresponding HARQ process is completed. At this time, for example, if ACK signal for HARQ process ID 0 is transmitted, a new HARQ process 1 may be allocated to be suitable for SPS signal transmission resource of the corresponding timing.

Also, assumption as to a retransmission subframe occurring at designated asynchronous HARQ process switching timing of n+3 after initial transmission subframe of a signal may not be performed by the UE. Alternatively, to simplify this, if switching of asynchronous HARQ process occurs, it may be assumed that this switching always occurs at the first retransmission timing.

If signal retransmission of the UE occurs at the Xth retransmission timing, the UE may have a difficulty in identification of two cases below.

Case 1: synchronous HARQ process transmission-: synchronous HARQ process transmission (x−2 times)-asynchronous uplink grant missing-asynchronous HARQ process transmission(xth)

Case 2: synchronous HARQ process transmission-: synchronous HARQ process transmission (x−2 times)-asynchronous uplink grant reception In this case, if it is assumed that the network has used the corresponding HARQ process ID from initial transmission in consideration of HARQ process ID which will be used for the asynchronous HARQ process, the UE may identify the HARQ process ID. However, in the worst case, the UE may miss several uplink grants, and in this case, the UE may not know PUSCH through which a corresponding signal has been retransmitted.

To avoid this obscurity, explicit signaling or a previously designated value as to when synchronous HARQ process is switched to asynchronous HARQ process may be provided to the UE.

Embodiment 2: HARQ ACK/NACK Signal Transmission During SPS Release

If DCI format 0/1 signal is transmitted to the UE through CSS in the middle of releasing transmission of the SPS signal, the UE may be configured to perform synchronous HARQ process of n+4. Also, if DCI format 0/1/2C/1D/4 signal is transmitted to the UE through USS, the UE may be configured to perform asynchronous HARQ process of n+3.

That is, the UE may be configured to perform synchronous HARQ process or asynchronous HACK process depending on whether HARQ ACK signal transmission for SPS signal release is performed through USS or CSS.

Embodiment 3: PHICH Transmission During HARQ Process Switching

Figure 11:
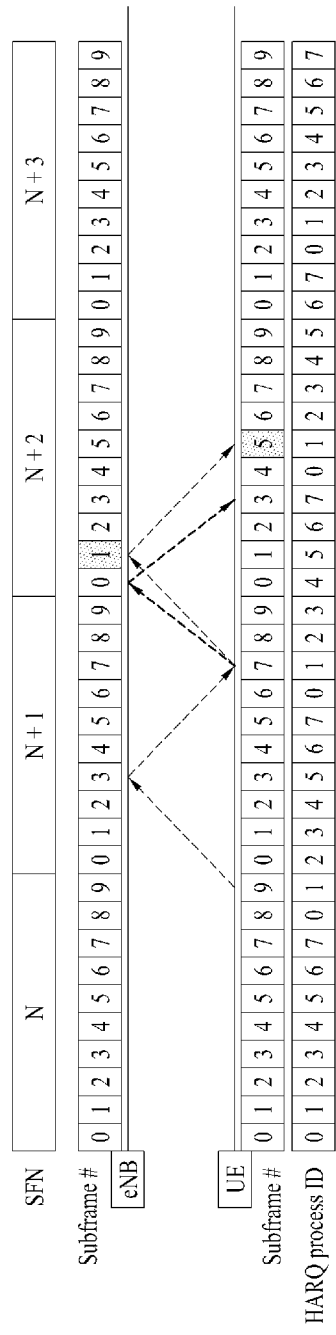
FIG. 11 is another diagram illustrating HARQ process according to one embodiment of the present invention.

FIG. 11 is another diagram illustrating HARQ process according to one embodiment of the present invention.

FIG. 11 illustrates that the UE is switched to asynchronous HARQ process in the middle of operating through synchronous HARQ process. In detail, FIG. 11 illustrates that synchronous HARQ process is switched to asynchronous HARQ process at subframe #7 of a radio frame N+1.

In this case, the base station may transmit HARQ ACK/NACK signal to the UE through PHICH at subframe #1 of a radio frame N+2. Therefore, the UE which operates in accordance with the synchronous HARQ process performs retransmission at subframe #5 of the radio frame N+2. However, this retransmission becomes an unnecessary operation if the HARQ process of the UE is switched to the asynchronous HARQ process at subframe #7 of the radio frame N+1.

Therefore, in this case, the UE may be configured so as not to perform any operation for the PHICH signal received at subframe #3 of the radio frame N+1. That is, if subframe at the time of signal retransmission is #n, it is likely that the UE will perform next retransmission at subframe #n+6, #n+7 or #n+8 in consideration of the asynchronous HARQ process and the synchronous HARQ process.

At this time, the UE may be configured to omit retransmission of #n+8 according to ACK/NACK value transmitted through PHICH at #n−4. Alternatively, if the UE receives an uplink grant indicating switching to the asynchronous HARQ process through subframe #n−2, #n−1 or #n, PHICH signal transmission for the corresponding HARQ process ID may be disregarded. Otherwise, if PUSCH signal is transmitted at subframe #n+6, #n+7, or #n+8, the UE may be configured to drop PUSCH retransmission at subframe #n+8.

As described above, in addition to the case that the uplink grant is received prior to the PHICH signal, there may be the case that the uplink grant and the PHICH signal are received at the same subframe and the case that the uplink grant is received to be later than the PHICH signal.

If the uplink grant is transmitted through the same subframe as that of the PHICH signal, the UE performs HARQ process by using information of the uplink grant. If latency is considered, the case that the uplink grant is received to be later than the PHICH signal does not occur.

In the aforementioned example, although the case that the present invention is applied to the FDD has been described, the present invention is not limited to this case. The configuration of the present invention according to the aforementioned example may equally be applied to even the case that HARQ process ID is configured in the wireless communication system of the TDD system.

Figure 12:
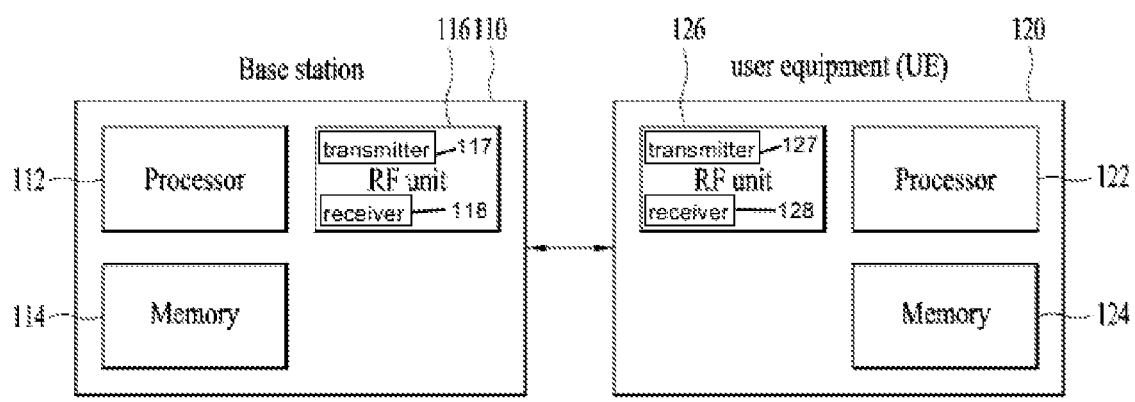
FIG. 12 is a diagram illustrating a Base Station (BS) and a User Equipment (UE) applicable to one embodiment of the present disclosure.

FIG. 12 illustrates a Base Station (BS) and a User Equipment (UE) applicable to an embodiment of the present disclosure.

Referring to FIG. 12, a wireless communication system includes a BS 110 and a UE 120. The BS 110 includes a processor 112, a memory 114 and an RF (radio frequency) unit 116. The processor 112 can be configured to implement the procedures and/or methods proposed in the present disclosure. The memory 114 is connected to the processor 112 and stores various kinds of information related to operations of the processor 112. The RF unit 116, which comprises a transmitter 117 and a receiver 118, is connected to the processor 112 and transmits and/or receives radio or wireless signals. The UE 120 includes a processor 122, a memory 124 and an RF unit 126. The processor 122 can be configured to implement the procedures and/or methods proposed in the present disclosure. The memory 124 is connected to the processor 122 and stores various kinds of information related to operations of the processor 122. The RF unit 126, which comprises a transmitter 127 and a receiver 128, is connected to the processor 122 and transmits and/or receives radio or wireless signals. The BS 110 and/or the UE 120 can have a single antenna or multiple antennas.

The above-described embodiments may correspond to combinations of elements and features of the present disclosure in prescribed forms. And, it may be able to consider that the respective elements or features may be selective unless they are explicitly mentioned. Each of the elements or features may be implemented in a form failing to be combined with other elements or features. Moreover, it may be able to implement an embodiment of the present disclosure by combining elements and/or features together in part. A sequence of operations explained for each embodiment of the present disclosure may be modified. Some configurations or features of one embodiment may be included in another embodiment or can be substituted for corresponding configurations or features of another embodiment. And, it is apparently understandable that a new embodiment may be configured by combining claims failing to have relation of explicit citation in the appended claims together or may be included as new claims by amendment after filing an application.

In this disclosure, a specific operation explained as performed by a BS can be performed by an upper node of the BS in some cases. In particular, in a network constructed with a plurality of network nodes including a BS, it is apparent that various operations performed for communication with a UE can be performed by a BS or other network nodes except the BS. In this case, the term "base station" can be replaced with terms such as "fixed station", "Node B", "eNodeB (eNB)", "access point", etc.

The embodiments of the present disclosure may be implemented using various means. For instance, the embodiments of the present disclosure may be implemented using hardware, firmware, software and/or any combinations thereof. In case of the implementation by hardware, one embodiment of the present disclosure may be implemented by at least one of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, one embodiment of the present disclosure may be implemented by modules, procedures, and/or functions for performing the above-explained functions or operations. Software code may be stored in a memory unit and may be then driven by a processor.

The memory unit may be provided within or outside the processor to exchange data with the processor through the various means known to the public.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

The method of transmitting and receiving a signal in a wireless communication system and apparatus therefor can be applied to various wireless communication systems.

The invention claimed is:

1. A method for performing, by a user equipment (UE), an uplink hybrid automatic repeat and request (HARQ) process in a wireless communication system, the method comprising:

transmitting uplink data based on a n+4 processing time at subframe #k;

receiving an ACK/NACK response to the uplink data through a physical HARQ indicator channel (PHICH) at subframe #k+4; and retransmitting the uplink data in response to the ACK/NACK response at subframe #k+8, wherein based on the UE performing an uplink HARQ process based on a n+3 processing time, the uplink data is transmitted at subframe #k, an ACK/NACK signal is received at subframe #k+3, and the uplink data is retransmitted at subframe #k+6, and wherein a PHICH including an ACK/NACK response corresponding to the uplink data scheduled by downlink control information (DCI) including information related to the n+4 processing time is ignored by the UE, based on the UE receiving the DCI including information related to the switching timing from the n+4 processing time to the n+3 processing time through the UE-specific/Dedicated Search Space (USS) at the subframe #k+4 based on a configured information of the UE.

2. The method of claim 1, wherein the UE supports switching from the n+4 processing time to the n+3 processing time.

3. The method of claim 1, wherein the UE is configured to perform an uplink HARQ process based on the n+4 processing time based on the DCI is received through a common search space (CSS).

4. A user equipment (UE) for performing an uplink hybrid automatic repeat and request (HARQ) process in a wireless communication system, the UE comprising:

transmitter and a receiver; and a processor, operatively coupled to the transmitter and the receiver, wherein the processor is configured to:
transmit uplink data based on a n+4 processing time at subframe #k, receive an ACK/NACK response to the uplink data through a physical HARQ indicator channel (PHICH) at subframe #k+4, and retransmit the uplink data in response to the ACK/NACK response at subframe #k+8, wherein based on the UE performing an uplink HARQ process based on a n+3 processing time, the uplink data is transmitted at subframe #k, an ACK/NACK signal is received at subframe #k+3, and the uplink data is retransmitted at subframe #k+6, and wherein a PHICH including an ACK/NACK response corresponding to the uplink data scheduled by downlink control information (DCI) including information related to the n+4 processing time is ignored by the UE, based on the UE receiving the DCI including information related to the switching timing from the n+4 processing time to the n+3 processing time through the UE-specific/Dedicated Search Space (USS) at the subframe #k+4 based on a configured information of the UE.

5. The UE of claim 4, wherein the UE supports switching from the n+4 processing time to the n+3 processing time.

6. The UE of claim 5, wherein the UE is configured to perform an uplink HARQ process based on the n+4 processing time based on the DCI is received through a common search space (CSS).

* * * * *